Figure 9:
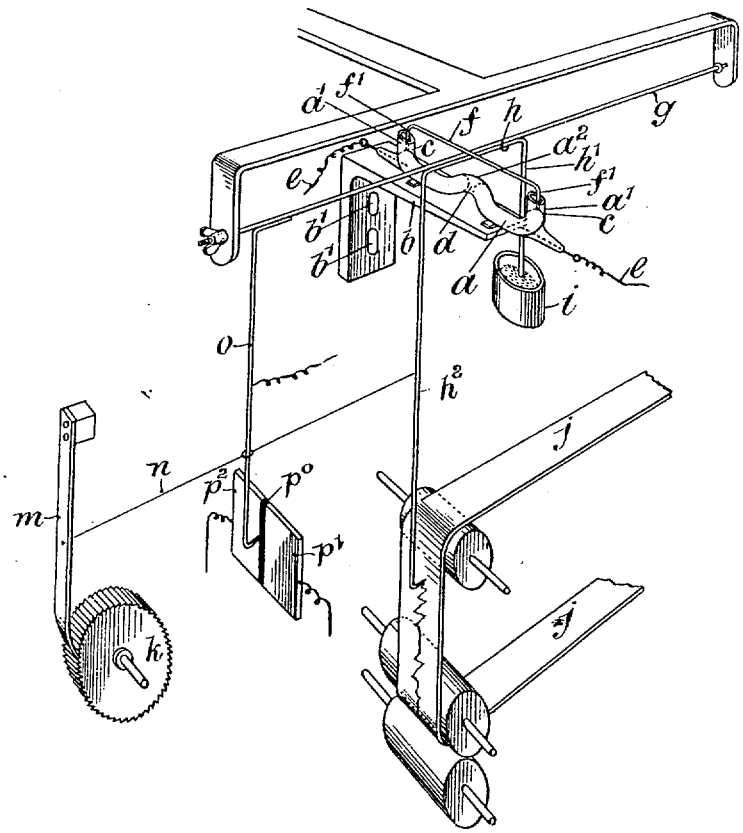

No. 872,193. PATENTED NOV. 26, 1907.
A. ORLING.
ELECTROCAPILLARY APPARATUS.
APPLICATION FILED JUNE 1, 1907.
2 SHEETS—SHEET 1.
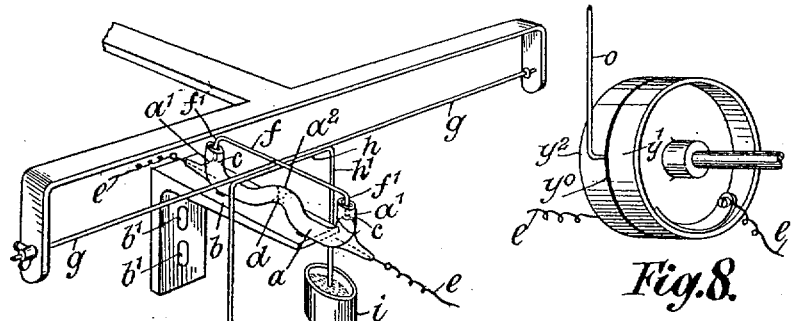
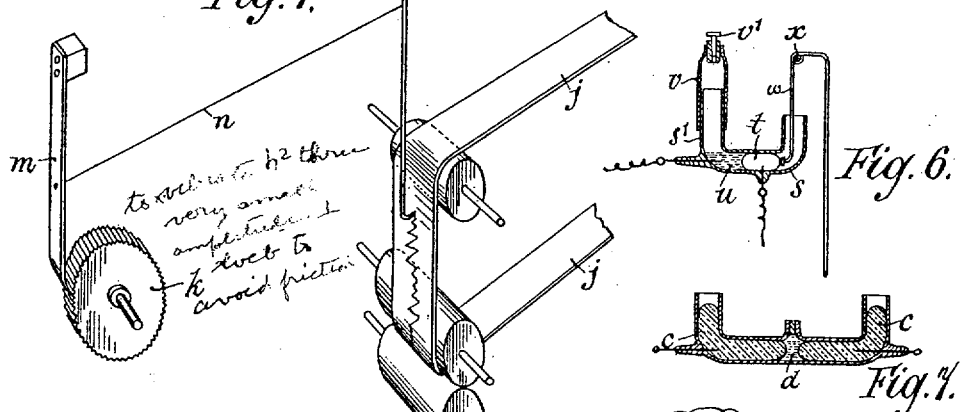
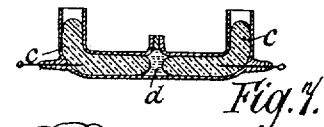
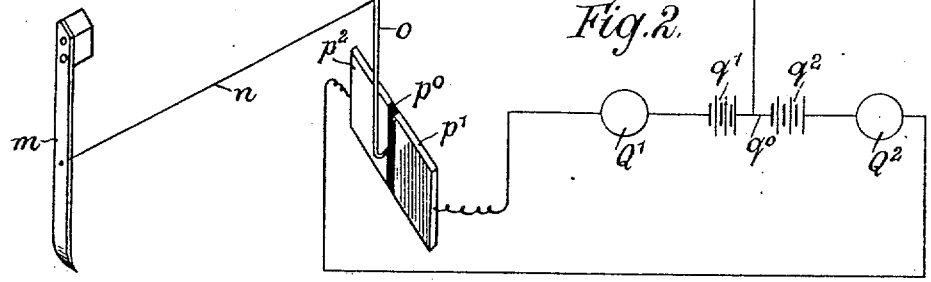
INVENTOR
Axel Orling
WITNESSES No. 872,193.

PATENTED NOV. 26, 1907.

A. ORLING.
ELECTROCAPILLARY APPARATUS.
APPLICATION FILED JUNE 1, 1907.

2 SHEETS—SHEET 2.

WITNESSES
Alvin J. White
W. P. Burch

INVENTOR
AXEL ORLING.

ATTY.

UNITED STATES PATENT OFFICE.

AXEL ORLING, OF UPPER TOOTING, ENGLAND.

ELECTROCAPILLARY APPARATUS.

No. 872,193.

Specification of Letters Patent.

Patented Nov. 26, 1907.

Application filed June 1, 1907. Serial No. 376,876.

*To all whom it may concern:*

Be it known that AXEL ORLING, subject of King of Sweden, residing at 4 Buckingham House, 111 Trinity road, Upper Tooting, in the county of Surrey, England, have invented new and useful Improvements in Electrocapillary Apparatus, of which the following is a specification.

This invention relates to electro-capillary apparatus wherein two dissimilar liquids are arranged to make contact with one another within a capillary passage and in which an electric current is adapted to be transmitted or electrical impulses passed from one liquid to the other, with the effect that the transmission of an impulse causes the displacement of the liquids and their meeting surface.

According to this invention the liquids are contained in a fixed horizontally situated tube and are caused to operate in the manner of a fluid piston or plunger and transmit their movement to a delicately suspended oscillating member the movement of which member is adapted to produce one of several desired effects such for example as the indication or record of the character of the impulses, the introduction of a relay in the electrical system, the starting of a mechanism or the like.

In order that the apparatus may respond to a very rapid succession of comparatively feeble electric impulses it is important that the mass which, by electro-capillary action is required to vibrate, be as small as possible consistent with the production of sufficient force to actuate with precision the indicating, recording or other member whose movement is required to be effected thereby.

On the accompanying drawing is shown as representative examples various forms of construction of apparatus adapted to fulfil the purpose of this invention.

In this drawing:—Figure 1 shows the contrivance fitted in a manner to effect a continuous record of the transmitted electric impulses on a traveling tape by the use of the known siphon recorder. Fig. 2 shows how the same instrument may be adapted to introduce a relay capable of reproducing the periodicity of the electric impulses with magnified intensity and indicating how those more powerful impulses may be utilized in actuating mechanisms. Figs. 3–8 show modifications in the details of the apparatus. Fig. 9 shows the arrangements shown in Figs. 1 and 2 combined.

In Fig. 1, $a$ is a tube the ends $a^1 a^1$ of which are bent upwards and the central portion $a^2$ of the length of which is arched upwards, the rest of the length of the tube being more or less exactly horizontal. This tube is secured to a bracket $b$ by cement or otherwise, the bracket being adapted to be adjusted in height by means of the elongated holes $b^1 b^1$ and screws. The tube contains two plugs $c\ c$ of electrically conducting liquid, as for example mercury, which plugs are separated by a plug $d$ composed of a dissimilar electrically conducting liquid as for example dilute sulfuric acid. From one plug $c$ to the other electric impulses are transmitted through the separating plug of liquid $d$, the impulses being conveyed by the leads $e\ e$ to and from the plugs $c\ c$. In the upturned ends of the tube $a$ are inserted the downward bent ends $f^1 f^1$ of a rod $f$ which, at the center of its length, is pivoted on a filament $g$, held in tension. Secured to the rod $f$ and the filament $g$ is a fine bore siphon tube $h$ the short leg $h^1$ of which dips into an ink receptacle $i$ and the long leg $h^2$ of which is adapted to make light contact with a traveling recording tape $j$. To eliminate friction between the extremity of $h^2$ and the tape $j$, a vibratory movement of very small amplitude is given to $h^2$ by the employment of a revolving disk $k$ having a serrated periphery, a spring $m$, the end of which is kept in contact therewith, and a thread $n$ uniting the spring $m$ and the siphon leg $h^2$.

With such an apparatus if electric impulses are transmitted through the leads $e\ e$ then, by electro-capillary action, the liquids $c\ d\ c$ will undergo a small displacement in the direction of the electric current and therefore a pulsating or alternating electric current will produce a pulsating movement in the liquids $c\ d\ c$ which will be communicated to the oscillating member $f$ causing it to angularly vibrate with the filament $g$ as its pivot. The angular vibration of $f$ will cause the extremity of the siphon tube $h^2$ to undergo horizontal to and fro excursions, the amplitude and periodicity of which will be recorded by the tracing of an ink line on the traveling tape $j$.

Fig. 2 shows how a vibrating rod $o$ which is substituted for the recording siphon $h$, or employed in addition thereto as shown in Fig. 9, may be caused to reproduce the periodicity of the electric impulses on a magnified scale by invoking an electrical relay.

For this purpose the end of the rod $o$ vibrates in contact with a plate of which the portion $p^1$ which is on the right of an insulating strip $p^0$ is connected to one pole of a local battery $q^1 q^2$ while the other portion $p^2$ is connected to the other pole of the battery the lead $q^0$ which joins the cells of one half the battery to those of the other half being connected up to the rod $o$ by a lead $r$. By means of this device, when the rod $o$ is in contact with $p^1$ an electric current will flow from the portion $q^1$ of the battery in one direction along the lead $r$ and when the extremity of $o$ is in contact with $p^2$ a current will flow from the portion $q^2$ of the battery in the opposite direction along the same lead $r$. If in the circuit of $r$ is placed an instrument adapted to be actuated by electric excitation in opposite ways by opposite currents such an instrument represented by R will be operated in response to feeble impulses transmitted through the leads $e\ e$. An instrument such as $Q^1$ in the circuit of $p^1$ and $q^1$ will respond to impulses in one direction only, another instrument such as $Q^2$ in the circuit of $p^2$ and $q^2$ responding only to impulses in the opposite direction. To eliminate friction between the extremity of the rod $o$ and the plates $p^1 p^0 p^2$ a vibrating device like that previously described is employed.

Figs. 3–5 show modifications in the construction of the tube $a$. In Fig. 3 the tube is of uniform bore throughout and the arched central portion $a^2$ is omitted. In Fig. 4 the turned up ends $a^1 a^1$ are reduced in diameter for the purpose of magnifying the amplitude of the movement of the upward turned ends of the plugs of mercury $c\ c$ and increasing the angle of vibration of the oscillating member $f$. In Fig. 5 a construction $a^3$ is formed in the center of the length of the tube $a$ wherein is contained the plug $d$ of liquid dissimilar to that which occupies the other portions of the tube. The smaller the bore of the passage in which the dissimilar liquids meet the more sensitive is the electro-capillary action.

Fig. 6 shows a modified construction in which the tube $s$ contains only one plug $t$ of mercury and only one surface of contact of the dissimilar liquids namely the left end of $t$, some dilute sulfuric acid $u$ being inserted in the left end of the tube $s$. The upward turned end $s^1$ of the tube is inclosed by a tube $v$ fitted with a plug $v^1$, the space within the tube $v$ being occupied by air which, with the vibratory movement of the liquids $t$ and $u$, will undergo expansion and contraction. The oscillating member consists of a flat ended bent glass rod $w$ pivoted at $x$ adjusted into light pressure contact with the convex right hand end of the plug of mercury $t$ and maintained in contact by spring pressure or by gravity. The volume and the pressure of the air confined in the tube $v$ can be adjusted by sliding it over the upturned end $s^1$.

By this construction the mass of fluid to be moved can be reduced to a minimum and the instrument rendered responsive to electric impulses of very short period. Inasmuch as the repulsion which exists between mercury and glass is most pronounced when the glass is quite dry it will be desirable to provide means for the introduction of the plug of sulfuric acid electrolyte to effect the separation of the two plugs of mercury with a minimum amount of wetting of the containing glass tube. Fig. 7 shows a construction for this purpose.

Fig. 8 shows an alternative construction of a portion of Fig. 2 in which for the plate $p^1 p^0 p^2$ is substituted a composite revolving drum $y^1 y^0 y^2$, $y^0$ being an insulating disk.

I claim.

1. An indicator of successive electric impulses, comprising a fixed, horizontally situated, capillary passage, two plugs of electrically conductive, immiscible liquids contained therein in contact with one another, two terminals of an electric circuit, one in electric connection with one liquid and the other with the second and oscillating member in such contact with one of the plugs of liquid and so mounted as to be adapted to partake of its pulsating movements.

2. An indicator of successive electric impulses, comprising a fixed, horizontally situated capillary passage having a short portion of its length slightly arched, two plugs of electrically conductive, immiscible liquids contained therein in contact with one another at the arched portion, two terminals of an electric circuit, one in electric connection with one liquid and the other with the second and an oscillating member in such contact with one of the plugs of liquid and so mounted as to be adapted to partake of its pulsating movements.

3. An indicator of successive electric impulses, comprising a fixed horizontally situated capillary passage, two plugs of electrically conductive, immiscible liquids contained therein in contact with one another, two terminals of an electric circuit, one in electric connection with one liquid and the other with the second and a pivoted oscillating member in contact with one extremity of one of the plugs of liquid.

4. An indicator of successive electric impulses, comprising a fixed horizontally situated capillary passage, two plugs of electrically conductive, immiscible liquids contained therein in contact with one another, two terminals of an electric circuit, one in electric connection with one liquid and the other with the second, an oscillating member in contact with one of the plugs of liquid and so mounted as to be adapted to partake of its pulsating movements and a recording device, one element of which is connected to the said oscillating member.

5. An indicator of successive electric impulses, comprising a fixed horizontally situated capillary passage, two plugs of electrically conductive, immiscible liquids contained therein in contact with one another, two terminals of an electric circuit, one in electric connection with one liquid and the other with the second and a pivoted oscillating member in contact with one extremity of one of the plugs of liquid, carrying one element of a recording device.

6. An indicator of successive electric impulses, comprising a fixed horizontally situated capillary passage, two plugs of electrically conductive, immiscible liquids contained therein in contact with one another, two terminals of an electric circuit, one in electric connection with one liquid and the other with the second, a pivoted oscillating member in contact with one extremity of one of the plugs of liquid, a siphon recording tube secured to the oscillating member and a recording strip in moving contact with the extremity of the siphon tube.

7. An indicator of successive electric impulses, comprising a fixed horizontally situated capillary passage, two plugs of electrically conductive, immiscible liquids contained therein in contact with one another, two terminals of an electric circuit, one in electric connection with one liquid and the other with the second, a pivoted oscillating member in contact with one extremity of one of the plugs of liquid and a device for making intermittent contact of which one terminal is in electric connection with a movable finger secured to the oscillating member and the other to a conductor with which the extremity of the said finger makes intermittent contact.

8. An indicator of successive electric impulses, comprising a fixed horizontally situated capillary passage, two plugs of electrically conductive, immiscible liquids contained therein in contact with one another, two terminals of an electric circuit, one in electric connection with one liquid and the other with the second, a pivoted oscillating member in contact with one extremity of one of the plugs of liquid and a device for making intermittent contact of which one terminal is in electric connection with a movable finger secured to the oscillating member and the other to a circular revolving conductor with the periphery of which the extremity of the said finger makes intermittent contact.

In testimony whereof I have signed my name to this specification in the presence of two subscribing witnesses.

AXEL ORLING.

Witnesses:
F. W. LANE,
H. D. JAMESON.